April 7, 1970     B. S. BAKER ET AL     3,504,536
TENSILE TEST SAMPLE HOLDER
Filed May 8, 1968
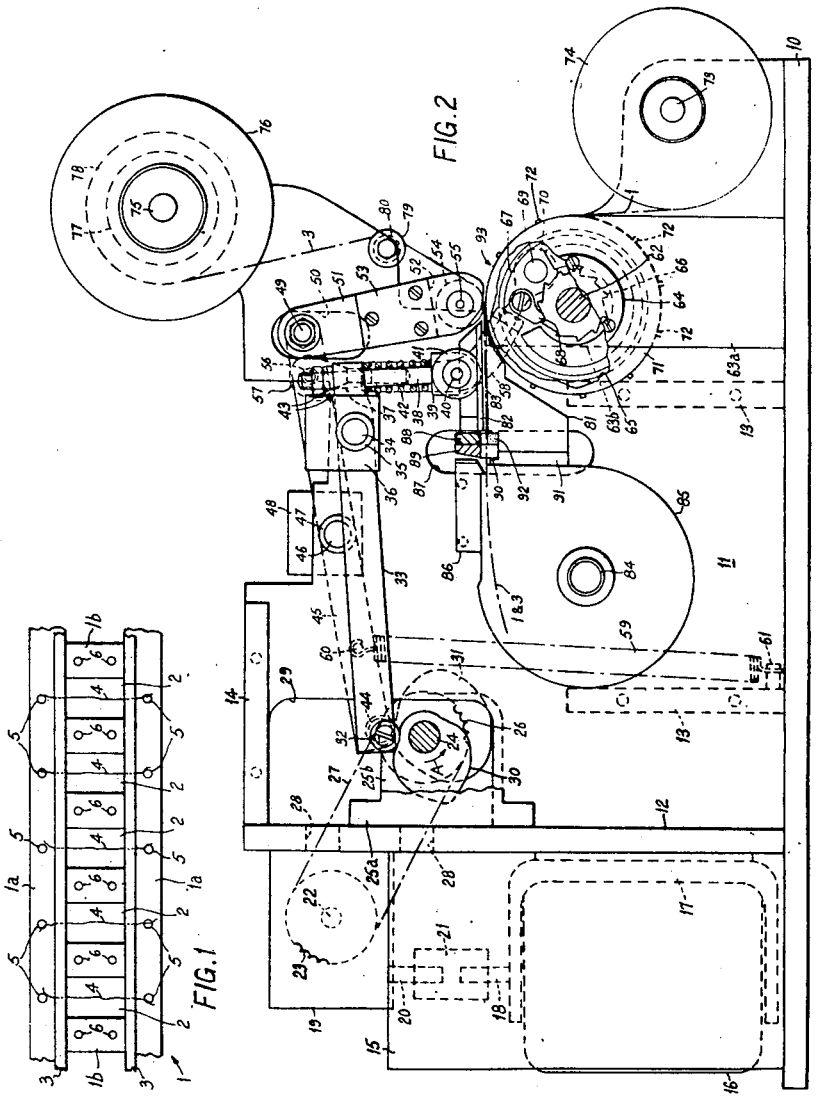
Inventors:
BERNARD STUART BAKER AND WILLIAM POOLE
By DAVIS, HOXIE, FAITHFULL & HAPGOOD,
Attorneys

3,504,536
TENSILE TEST SAMPLE HOLDER
Bernard S. Baker and William Poole, Coventry, England, assignors to Courtaulds Limited, London, England, a British company
Filed May 8, 1968, Ser. No. 727,402
Claims priority, application Great Britain, May 10, 1967, 21,687/67
Int. Cl. G01n 3/08
U.S. Cl. 73—95                 17 Claims

ABSTRACT OF THE DISCLOSURE

A method of mounting a sample of filamentary material preparatory to subjecting it to a tensile test comprising holding the sample at two positions spaced along its length between, at each position, two surfaces of which at least one is a surface of a deformable sheet material. A mounting for carrying out this method and apparatus for handling the mounting are also described.

---

This invention relates to the determination of the tensile properties of filamentary materials, in particular textile filamentary materials including for example filaments, fibres, yarns and threads.

The normal method of determining the tensile properties of a sample of a filamentary material is to grip a short length of the sample between two pairs of clamps and then to move the pairs of clamps apart until the sample breaks, at which point the force necessary to cause the break is measured, and also the length of the sample in relation to its original length.

With certain types of filamentary materials, for example nylon filaments, it is difficult, if not sometimes virtually impossible, to grip samples of the materials between the pairs of clamps in a satisfactory manner. Too loose a grip allows the samples to be pulled out of the clamps whilst a tighter grip causes the samples to be damaged and to break prematurely at the damaged part.

It has been attempted to overcome this problem by using resilient jaws on the clamps, instead of using metal jaws. This enables a slightly greater area of contact between the jaws and the samples to be tested. However, such jaws must naturally be softer than metal jaws and they tend to be damaged by gripping samples of particular filamentary materials, nylon filaments again being amongst the worst in this respect.

According to the present invention a sample of a filamentary material is held for the determination of its tensile properties between two surfaces at least one of which is a surface of a deformable sheet material.

The use of a deformable sheet material means that the sample can be gripped more securely than before because a larger portion of the surface of the sample is contacted by the holding surfaces. Moreover, because the deformable surface is that of a sheet material which can be replaced after each test, there is no damage to the jaws of any clamps which may be used.

The deformable sheet material is preferably a tape or strip of material for convenience in handling. Examples of suitable materials are polyvinyl chloride and polyethylene tapes. The material is preferably non-resiliently deformable to a certain extent as this improves the ability of the sheet material to surround the sample when pressure is applied to urge the sample holding surfaces together.

A particularly useful deformable sheet material comprises a plastic tape with an adhesive layer on one side of it. The adhesive layer serves to hold the sheet material to the other sample holding surface and also to hold the sample more firmly due to its greater ease of deformation compared with the sheet material itself. When the sheet material has an adhesive layer on one of its surfaces, the other sample holding surface is preferably a surface of a second sheet material, which may or may not have a second adhesive layer on its surface.

The use as the sample holding surfaces of two sheet materials, at least one of which has an adhesive layer, enables samples of filamentary materials to be placed and then firmly held between the materials in the form of tapes. Sections of the tapes can subsequently be cut off, each section bearing an individual sample, and attached to the relatively movable arms of a tensile testing machine. When a low denier monofilament is to be tested it may be sufficient merely to attach parts of the sheet materials holding each of the samples to the arms by clamps or other devices on the arms, which can then be moved apart for normal testing. In this case the adhesion between the sheet materials is sufficient to hold the samples. Where, however, the filamentary material is other than a low denier monofilament, for example if it is a yarn or a heavy denier monofilament, it is preferable to clamp the samples through the sheet materials and thereby exert a greater clamping force on the samples whilst they are extended.

Using this latter method we have found it possible accurately to determine the tensile properties of some filamentary materials for which only approximate results have been able to be determined before, due to the tendency for samples of the materials to slip through the jaws of the clamps then used.

In a preferred embodiment of the invention where both sample holding surfaces are surfaces of sheet materials, one such material is a continuous paper tape with cutout rectangular openings so that the tape has a ladder-like appearance. To mount samples of filamentary materials on the ladder-like tape of sheet material, individual samples are placed across the rectangular gaps in the tape and then two self-adhesive plastic tapes are unwound from one or two further reels and laid along the continuous strips at the sides of the first ladder-like tape. The two adhesive tapes holding each end of the sample are then urged into close contact with the ladder-like tape by passing the laminated assembly between pressure rollers. This system has the advantage that the length of the samples can be predetermined and uniform according to the distance between the continuous side strips of the ladder-like tape. After a number of samples have been mounted on the tapes as described, the parts of the tapes surrounding each sample can be separated from the remainder of the tapes and the cross pieces of the ladder-like tape are either severed or completely removed before or after the side strips of the tapes are attached to arms on a tensile testing machine by clamps or otherwise, so as to allow the arms to be moved apart, for determining the tensile properties of the sample.

A further advantage of the preferred method of mounting the samples of filamentary materials, by the use of tapes as described, is that automatic mounting of the samples of filamentary materials onto the tapes and the subsequent automatic loading of the mounted samples on the tapes onto the relatively movable arms of a tensile testing machine is made possible.

The invention includes an apparatus on which samples of a filamentary material can be placed and held between two sheet materials in tape form, at least one of which sheet material bears a layer of an adhesive, for the subsequent determination of the tensile properties of the samples, comprising means for mounting two rotatable reels of the sheet materials in tape form, means for with-drawing the sheet materials from the reels, when mounted on the apparatus, to a position where samples of a filamentary material can be placed between the sheet materials and means for subsequently urging the sheet materials into close contact so as firmly to hold the samples of the filamentary material between them.

The invention further includes a sheet material, which may be in tape form, particularly adapted for holding samples of a filamentary material for its tensile testing.

The invention is illustrated by way of example in the accompanying drawing, in which FIGURE 1 is a plan of a ladder-like tape on which samples of a filamentary material are mounted, and FIGURE 2 is an elevation, partly in section, of an apparatus on which samples of a filamentary material may be mounted on a ladder-like tape as shown in FIGURE 1.

FIGURE 1 shows a ladder-like paper tape 1 comprising two continuous side strips 1a and a plurality of transverse connecting strips 1b between them a plurality of rectangular openings 2. Two narrow self-adhesive tapes 3 are adhesively attached to the continuous side strips 1a of the ladder-like tape 1, with the inner edges of the tapes 3 adjacent to the shorter sides of the rectangular openings 2.

Individual staple fibres 4 are positioned symmetrically across the rectangular openings 2 and are held in position by the adhesive tapes 3.

The continuous side strips 1a of the tape 1 have a plurality of circular holes 5 through them at points transversely aligned with the fibres 4. These holes are for facilitating mounting short sections of the tape 1, each section bearing an individual fibre 4, on the relatively movable arms of a tensile testing machine for determining the tensile properties of the fibres. Further pairs of circular holes 6 through each of the transverse strips 1b of the tape 1 are for receiving pairs of pegs on a drum controlling the movement of the tape when mounting staple fibres or samples of other filamentary materials on the tape, as described below with reference to FIGURE 2.

The apparatus shown in FIGURE 2 comprises a generally rectangular base plate 10 to which a vertical plate 11 is attached, so as to lie parallel to the longer sides of the base plate, by a second vertical plate 12 bolted to the both of the plates 10 and 11 and positioned to lie parallel to the shorter sides of the base plate. Two triangular plates 13 are also bolted to the plates 10 and 11 and a further triangular plate 14 is bolted to the plates 11 and 12, adjacent to their top edges, for reinforcement of the structure. Two rectangular plates 15, of which only the nearer one can be seen, are bolted to the base plate 10 and to the side of the plate 12 remote from the plate 11, the two plates 15 being parallel to the plate 11 and each disposed close to a different one of the longer sides of the base plate.

An electric motor 16 is mounted on a sub-frame 17 attached to the plate 12, so as to lie between the plates 15 with its output shaft 18 vertical. A reduction gear-box 19 is positioned on the plate 12 above the motor 16 and with input shaft 20 of the reduction gear-box connected by a flexible coupling 21 to the output shaft 18 of the motor. The output shaft 22 of the gear-box 19 carries a sprocket 23.

On the side of the pltae 12 remote from the gear-box 19 is a horizontal shaft 24 which is rotatable in bearings (not shown) in two bearing housings 25a and 25b bolted to the plate 12. The nearer bearing housing 25a is partly cut away and the shaft 24 is shown in section, to show more clearly the parts carried by the shaft. At its end adjacent to the bearing housing 25b the shaft 24 carries a sprocket 26 which is connected to the sprocket 23 on the gear-box 19 by a chain 27, shown as a chain-dotted line, passing through two holes 28 in the plate 12. A further hole 29 is made in the plate 11 for the shaft 24 to pass through.

Between the sprocket 26 and the bearing housing 25a, the shaft 24 carries a cam 30 on the near side of the plate 11 and a cam 31 on the far side of the plate. The highest point of the cam 31 is 90° in advance of that of the cam 30 on the shaft when the shaft is rotated, as described below in the direction of the arrow A. A roller 32, which is positioned so as to follow the operative surface of the cam 30, is rotatably mounted on one end of a straight arm 33 which is pivotally mounted about a pin 34 located in plain bearings 35 in a block 36 bolted to the nearer side of the plate 11. The end of the arm 33 remote from the roller 32 has a bore 37 perpendicular to the pivot pin 34 in which a shank 38 is a free sliding fit. The free end of the shank 38 carries a boss 39 through which a rotatable spindle 40 passes. Two rollers 41 are mounted on the ends of the spindle 40 so as to be rotatable about an axis parallel to the pivot pin 34. A coil spring 42 is located around the shank 38 between the boss 39 and the arm 33 so as to tend to urge the boss away from the arm 33, removal of the shank 38 from the bore 37 being prevented by two locking nuts 43 on the other screw-threaded end of the shank 38. The locking nuts 43 also provide for adjustment of the movement of the rollers 41.

A second roller 44, which is positioned so as to follow the operative surface of the cam 31 is mounted on the end of a second arm 45 on the far side of the plate 11. The arm 45 is pivoted about a pivot pin 46 in plain bearings 47 in a block 48 bolted to the plate 11. The end of the arm 45 remote from the roller 44 bears a fixed pin 49 parallel to the pivot pin 46, which pin 49 passes through a hole 50 in the plate 11. On the free end of the pin 49 there is a rotatable block 51. The free end of the block 51 has recesses 52 at both sides and each recess is covered by a plate 53 screwed to the member 51 so as to provide two gaps in each of which a roller 54 is rotatably mounted on a pin 55. The axial distance apart of the rollers 54 and of the rollers 41 is equal to the transverse separation of the adhesive tapes 3 on the ladder-like tape of FIGURE 1.

The arm 45 carries a further pin 56 parallel to the pin 49, but projecting from the arm in the opposite direction, on which a boss 57 is pivotally mounted. The boss is connected to the upper end of a bent arm 58.

The roller 44 on the arm 45 is maintained in contact with the cam 31 by a coil spring 59 attached to a pin 60 on the arm 45 and to a pin 61 on one of the triangular reinforcing plates 13.

A shaft 62 is rotatably mounted in bearings (not shown) in housings 63a, 63b situated on opposite sides of the plate 11. The nearer housing 63a and its bearing cover plate 64 are partly cut away to show the shaft 62 in section and other parts between the bearing housings more clearly. The shaft 62 passes through a circular hole 65 in the plate 11. Between the plate 11 and the far bearing housing 63b the shaft carries a fixed ratchet wheel 66 and a circular disc 67 which is rotatable about the shaft. The disc carries a pawl 68 on its face adjacent to the ratchet wheel so that the pawl engages with the teeth of the ratchet wheel. The disc 67 also bears on a pin 69 on which a boss 70 is rotatably mounted, the stem of the boss being adjustably connected to the lower end of the bent arm 58. On downward movement of the bent arm 58 the disc 67 is rotated in a clockwise direction, and it is moved in an anticlockwise direction when the bent arm 58 is moved upwardly. During each such movement of the disc 67, which occurs during each revolution of the shaft 24 and thus of the cam 31, which causes movement of the arm 45, the cooperation of the pawl 68 and ratchet 66 causes the shaft 62 to be moved anticlockwise by one-eleventh of a revolution, as there are eleven teeth on the ratchet wheel.

On the end of the shaft 62 between the plate 11 and the nearer bearing housing 63a there is a drum 71, part of which is cut away to reveal the underlying structure. The drum 71 carries eleven pairs of pegs 72, only one peg of each pair being visible. The pegs are separated by circumferential and axial distances corresponding to the distance between the holes 6 in the ladder-like tape of FIGURE 1. The circumferential separation of the pairs of pegs 72 is also equal to one-eleventh of the circumference of the drum 71. The drum 71 is positioned beneath the block 51 so that the rollers 54 on the block roll over the surface of the drum on rotation of the latter. During movement of the arm 45 causing rotation of the drum the pin 49 is also moved downwards which causes the block 51 to pivot in an anti-clockwise direction about the pin whilst its rollers 54 follow the surface of the drum for approximately one-eleventh of the drum's circumference.

The plate 11 carries on its near side, adjacent to the nearer bearing housing 63a, a fixed spindle 73 on which a roll 74 of the paper tape 1 of FIGURE 1 is rotatably mountable. The roll is positioned so that the tape 1, shown in chain-dotted line, withdrawn from the roll can be passed directly to the drum 71. The plate 11 also carries a spindle 75 on which a reel 76 is rotatably mounted. The reel has two axially spaced channels 77 for receiving rolls 78 of the self-adhesive tapes 3, the axial separation of the rolls 78 being the same as the distance between the tapes 3 when attached to the paper tape 1. Beneath the spindle 75 the plate 11 carries a rotatable roller guide 79, which has two circumferential grooves 80 separated by an axial distance equal to that between the rolls 78, through which grooves the tapes 3, the path of which is shown as a chain-dotted line, pass from the rolls 78 to the rollers 54.

The plate 11 also carries on its near side a lower tape guide 81 and an upper tape guide 82 which define between them a narrow channel 83 along which the tapes 1 and 3, after being adhesively stuck together, are passed from the drum 71 and the rollers 54. The upper tape guide 82 has a slot cut in its horizontal part through which the rollers 41 pass for exerting a mangling pressure on parts of the superimposed tapes 1 and 3, during use of the apparatus as described below.

A spindle 84 projects from the near side of the plate 11 and a container 85 is mounted thereon for collecting the combined tapes 1 and 3. A guide block 86 is also positioned on the near side of the plate 11 for locating the container 85 and the for guiding the end of the tapes 1 and 3 into the container.

A hole 87 passes through the plate 11 in the region of the upper and lower tape guides 81 and 82 and the guide block 86. An arm 88 (shown in section) passes through the hole 87 and is pivoted at a point on the far side of the plate 11 to a bracekt (not shown). The far end of the arm 88 is also connected to one end of a coil spring (not shown) the other end of which is connected to a pin on the base plate 10. The spring tends to hold down the part of the arm 88 on the far side of the plate 11, so that the part on the near side of the plate is held out of the path of the tapes 1 and 3, whilst still allowing manual movement of the arm, which carries a handle at its near, free end for this purpose. The arm 88 carries a guillotine blade 89 at the point where it passes between the upper tape guide 82 and the guide block 86. On downward movement of the arm 88 the guillotine blade cooperates with an edge 90 on a part 91 attached to the lower tape guide 81 to cut the tapes 1 to 3 when desired. A piece of foam rubber, 92 is located in a groove in the lower tape guide 81 for preventing the tape from being bent on downward movement of the arm 88 with its guillotine blade 89.

To use the apparatus a roll of the paper tape of FIGURE 1 is mounted on the spindle 73 and two rolls 78 of the self-adhesive tape 3 of FIGURE 1 are mounted on the reel 76. Lengths of the adhesive tapes are then attached to the tape 1 and a short length of the attached tapes is threaded into the apparatus, the block 51 being temporarily lifted to facilitate this operation, and some of the pegs 72 are located in holes 6 in the tape 1. A staple fibre sample 4 to be tested is then placed across the tape 1 on the surface of the drum 71 at the position marked 93. Rotation of the motor 16 is then commenced, preferably by the depression of a foot pedal switch whilst the ends of the staple fibre sample are manually held in the position 93. Rotation of the motor causes the shaft 24 to rotate in the direction of the arrow A through the gearbox and chain-drive to the shaft. As the shaft rotates, the left hand end of the arm 45 rises as its roller 44 follows the contour of the cam 31. This causes the opposite end of the arm 45 to be lowered so that the block 51 moves downwards and pivots anticlockwise, the rollers 54 at its free end following the surface of the drum 71 so that lengths of the tapes 3 are withdrawn from the rolls 78 and adhesively attached to the tape 1 so that the staple fiber sample becomes held between them. The operator's hands can then be withdrawn.

The movement of the arm 45 simutaneously causes downward movement of the bent arm 58 so causing the disc 67 to be rotated in a closkwise direction to the point where the pawl 68 drops into engagement with the next tooth on the ratchet wheel 66.

Continued rotation of the shaft 24 and the cam 31 allows the end of the arm 45 bearing the roller 44 to be lowered under the influence of the spring 59. During this movement the block 51 reverts to the position shown in the drawing whilst the drum 71 is rotated anticlockwise by one-eleventh of a revloution through the engagement between the pawl 68 and the ratchet wheel 66.

During the rotation of the shaft 24 the roller 32 follows the surface of the cam 30 thereby causing the arm 33 to be pivoted about the pin 34. This movement causes the rollers 41 to be brought into contact with the tapes 1 and 3 through the slot in the upper tape guide 82. The rollers exert a mangling pressure on the tapes, which is variable according to the strength of the coil spring 42, and the roller is also moved horizontally over a short direction in the slot so that the rollers cover lengths of the tapes in the regions of the rectangular openings 2.

It can be arranged that the shaft 24 rotates by one complete revolution each time a switch, preferably a foot pedal switch as mentioned above, is operated by having a microswitch operated by a further cam (not shown) at one or the other end of the shaft 24. Alternatively it can be arranged that the motor is switched off when the shaft has completed a half revolution, at the point when the roller 44 is at its highest point, in which case continued rotation of the motor is subsequently caused by the operator of the apparatus by operation of a further switch or by the first switch if that switch is incorporated with a microswitch operated by the shaft 24 in a two-way switching circuit. The second sequence of operation is preferred as there is then a greatly decreased risk of the operator's hands being caught in the apparatus, because the hands can be removed after the shaft has rotated by the first half a turn.

The operation of mounting a staple fibre sample between the tapes 1 and 3 can be repeated as often as desired. When the required number of staple fibres have been mounted, the shaft is caused to be rotated by a few turns without mounting staple fibre samples on the tapes so as to pass the last sample mounted beneath the mangle rollers 41 and past the guillotine blade 89, whereafter the guillotine is manually operated to sever the tapes bearing the staple fibre sample from the following length of tapes.

The determination of the tensile properties of the staple fibre samples 4 mounted on the tapes in the manner described above may be readily accomplished. Use of the tapes enables the sample to be mounted automatically onto the relatively movable arms of a tensile testing apparatus using an apparatus constructed as described in the specification of copending patent application No.

727,766 of even date. Alternatively, manual mounting of the mounted samples can be adopted. In either case it is necessary to separate the tape 1 into sections each of which carries only one staple fibre, and also to sever the transverse side strips 1b between the side strips 1a to allow the fibres to be stretched during testing. The parts of the continuous side strips 1a of the tape 1 adjacent each staple fibre may be connected to the relatively movable arms of a tensile testing machine before or after separation of the section of the tape bearing the staple fibre from the rest of the tape and before or after severance of the transverse strips 1b. The parts of the side strips are usually connected to the relatively movable arms by clamps on the arms. Such clamps can be used to grip only the outer side edges of the paper tape, if low denier staple fibres are tested, or to grip both tapes together at the point where the staple fibre sample passes between them in the testing of heavy denier fibre samples.

The holes 5 on the tape may be used to locate the parts of the side strips 1a on the relatively movable arms by passing pegs through the holes 5 prior to clamping the tape, if desired. This procedure is particularly useful when the parts of the tape bearing samples are automatically mounted on the relatively movable arms of a tensile testing machine, as the clamping can then be done after loading the tape on the arms to prevent the movement of the clamps interfering with the automatic loading apparatus.

What is claimed is:

1. A mounting for a sample of filamentary material which is to be subjected to a tensile test comprising a ladder-like tape having side-strips and cross-strips and adapted so that the filamentary material can be held at a position intermediate adjacent cross-strips and running transversely of the tape from side-strip to side-strip.

2. A mounting as claimed in claim 1 in which the ladder-like tape is a deformable material.

3. A mounting as claimed in claim 2 comprising in combination with the ladder-like tape two tapes which can be superimposed and stuck on the side-strips of the ladder-like tape so as to hold the sample of filamentary material.

4. A mounting as claimed in claim 3 in which either the side-strips of the ladder-like tape or the two tapes or both have adhesive surfaces.

5. A mounting as claimed in claim 3 in which the ladder-like tape and/or the tapes are made of a plastics material.

6. Apparatus for mounting successive samples of filamentary material at successive locations along the length of a ladder-like tape having side-strips and cross-strips so that each sample is held at a position intermediate adjacent cross-strips and running transverse to the tape from side-strip to side-strip, comprising a first reel for holding a supply of the ladder-like tape, a second reel or reels for holding a supply of a pair of tapes, a pair of nip rollers for drawing the three tapes off the reels and for superimposing and sticking the pair of tapes on the side-strips of the ladder-like tape so as to hold between the tapes samples of filamentary material which are suitably positioned across the ladder-like tape as it enters the nip of the rollers, and a drive for the nip rollers.

7. Apparatus as claimed in claim 6 in which the drive for the nip rollers operates intermittently.

8. Apparatus as claimed in claim 6 including an additional nipping device for the combined tapes for promoting their adhesion.

9. Apparatus as claimed in claim 6 including a cutter for severing the combined tapes.

10. In a method of carrying out a tensile test on a sample of filamentary material comprising the steps of gripping the sample at two positions spaced apart along its length between clamping jaws mounted on the relatively movable arms of a tensile testing machine and applying tension to the sample, the improvement which comprises the steps of placing one end of the sample between two sheet materials at least one of which has an adhesive layer, placing the other end of the sample between two sheet materials at least one of which has an adhesive layer and gripping at least one of the sheet materials at each end of the sample in the relatively movable jaws of a tensile testing machine.

11. In the method of claim 10, the further step of deforming at least one of the sheet materials about each end of the sample.

12. In a method of carrying out a tensile test on a sample of filamentary material comprising the steps of gripping the sample at two positions spaced apart along its length between clamping jaws mounted on the relatively movable arms of a tensile testing machine and applying tension to the sample, the improvement which comprises mounting said sample prior to testing on a ladder-like tape of a deformable material having side-strips and cross-strips, at a position intermediate adjacent cross-strips and running transversely of the tape from side-strip to side-strip.

13. A method as claimed in claim 12 comprising holding a sample of filamentary material across the side-strips of the ladder-like tape and then superimposing on and sticking to the side-strips two tapes so that the sample is held between the side-strips and the tapes at two spaced positions.

14. A method as claimed in claim 13 comprising mounting successive samples of filamentary material at positions along the ladder-like tape intermediate successive adjacent cross-strips.

15. A method as claimed in claim 12, including the step of cutting off a part of the ladder-like tape on which a sample of filamentary material is mounted from the remainder of the tape, either before or after gripping the side-strips of that part of the tape in clamping jaws mounted on the relatively-movable arms of a tensile testing machine.

16. A method as claimed in claim 15 including the step of severing any cross-strips on the part of the ladder-like tape prior to subjecting the sample of filamentary material to a tensile test.

17. In a method of carrying out a tensile test on a sample of filamentary material comprising the steps of gripping the sample at two positions spaced apart along its length between clamping jaws mounted on the relatively movable arms of a tensile testing machine and applying tension to the sample, the improvement which comprises mounting said sample prior to testing on a ladder-like tape having side-strips and cross-strips, at a position intermediate adjacent cross-strips and running transversely of the tape from side-strip to side-strip, by gripping the sample between the ladder-like tape and deformable adhesive tape.

References Cited

UNITED STATES PATENTS

| 1,496,803 | 6/1924 | Amsler | 73—103 |
| 3,290,929 | 12/1966 | Sheldon | 73—95 |
| 3,390,573 | 7/1968 | Ivanovic | 73—95 |

JERRY W. MYRACLE, Primary Examiner

U.S. Cl. X.R.

73—103